United States Patent
Shin et al.

(10) Patent No.: US 12,422,983 B2
(45) Date of Patent: Sep. 23, 2025

(54) MEMORY MANAGEMENT METHOD BASED ON COMPRESSED MEMORY AND APPARATUS USING THE SAME

(71) Applicant: SAMSUNG ELECTRONICS CO., LTD., Suwon-si (KR)

(72) Inventors: Youngsam Shin, Suwon-si (KR); Deok Jae Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/735,491

(22) Filed: Jun. 6, 2024

(65) Prior Publication Data

US 2025/0021227 A1   Jan. 16, 2025

(30) Foreign Application Priority Data

Jul. 11, 2023   (KR) .................. 10-2023-0089788

(51) Int. Cl.
*G06F 3/06* (2006.01)

(52) U.S. Cl.
CPC .......... *G06F 3/0608* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 7,702,875 B1 * | 4/2010 | Ekman .................... | G06F 12/08 |
| | | | 711/170 |
| 9,501,422 B2 | 11/2016 | Baskakov et al. | |
| 10,372,606 B2 | 8/2019 | Malladi et al. | |
| 2004/0030847 A1 * | 2/2004 | Tremaine ................ | G06F 12/08 |
| | | | 711/158 |
| 2007/0245097 A1 | 10/2007 | Gschwind et al. | |
| 2014/0244603 A1 | 8/2014 | Arges et al. | |
| 2022/0011941 A1 * | 1/2022 | Alverti .................... | G06F 12/08 |
| 2022/0012184 A1 | 1/2022 | Arelakis et al. | |
| 2022/0091890 A1 | 3/2022 | Tsirkin et al. | |

(Continued)

OTHER PUBLICATIONS

Guoxi Li, et al., "Hzmem: New Huge Page Allocator with Main Memory Compression", College of Computer Science, Zhejiang University, Hangzhou, 310027, China, Aug. 2017.

(Continued)

*Primary Examiner* — Jared I Rutz
(74) *Attorney, Agent, or Firm* — F. CHAU & ASSOCIATES, LLC

(57) ABSTRACT

A memory management method based on a compressed memory and an apparatus using the same are provided. A memory device includes a memory and a near memory processing unit. The memory includes a normal memory area for storing uncompressed data and a compressed memory area for storing compressed data. The near memory processing unit is configured to receive a first command to frontswap-store a huge page, which is stored in the normal memory area, in the compressed memory area; identify addresses of sub-pages of the huge page based on an address of the huge page; compress the sub-pages using the addresses of the sub-pages to generate compressed sub-pages; and store the compressed sub-pages in the compressed memory area. A size of the huge page is larger than a regular page.

20 Claims, 16 Drawing Sheets

(56) References Cited

U.S. PATENT DOCUMENTS

| | | | |
|---|---|---|---|
| 2022/0197816 A1* | 6/2022 | Powley | G06F 12/0886 |
| 2022/0236904 A1* | 7/2022 | Miller | G06F 3/0649 |
| 2022/0294470 A1* | 9/2022 | de Abreu Pinho | G06F 16/17 |
| 2024/0069810 A1* | 2/2024 | Shin | G06F 3/0673 |
| 2024/0231614 A9* | 7/2024 | Park | G06F 3/0673 |
| 2025/0138729 A1* | 5/2025 | Zhao | G06F 3/0673 |

OTHER PUBLICATIONS

European Search Report cited in EP 24 18 7050, dated Nov. 12, 2024. 6 pages.

* cited by examiner

MEMORY MANAGEMENT METHOD BASED ON COMPRESSED MEMORY AND APPARATUS USING THE SAME

CROSS-REFERENCE TO RELATED APPLICATIONS

This patent application claims priority under 35 USC § 119(a) to Korean Patent Application No. 10-2023-0089788, filed on Jul. 11, 2023, in the Korean Intellectual Property Office, the entire disclosure of which is incorporated by reference in its entirety herein.

1. TECHNICAL FIELD

Embodiment of the present disclosure is directed to a memory management method based on compressed memory and an apparatus using the same.

2. DISCUSSION OF RELATED ART

Swap is a memory management technique to prevent a memory shortage by moving a portion of memory allocated to an application program to an auxiliary storage device (e.g., a solid state drive (SSD) or a hard disk drive (HDD)) with a relatively large capacity when a main memory area to be allocated to the application program is insufficient.

When the main memory area is insufficient, an operating system may move data in a memory area already allocated to an application program to a swap area of a non-volatile memory used as an auxiliary storage device to alleviate the memory shortage.

However, the cost of moving data to an auxiliary storage device is considerable. Data needs to be transmitted through a relatively slow system bus compared to the main memory, and the stored data needs to be retrieved to be output to the main memory, if necessary. In this case, the performance of an application program may be degraded.

SUMMARY

In an embodiment, a memory device includes a memory and a near memory processing unit. The memory includes a normal memory area for storing uncompressed data and a compressed memory area for storing compressed data. The near memory processing unit is configured to: receive a first command to frontswap-store a huge page, which is stored in the normal memory area, in the compressed memory area; identify addresses of sub-pages of the huge page based on an address of the huge page; compress the sub-pages using the addresses of the sub-pages to generate compressed sub-pages; and store the compressed sub-pages in the compressed memory area. A size of the huge page is larger than a regular page.

In an embodiment, a memory device includes a memory, a first processing unit, and a second processing unit. The memory includes a first memory channel including a first normal memory area and a first compressed memory area and a second memory channel including a second normal memory area and a second compressed memory area. The first processing unit disposed to communicate with the first memory channel. The second processing unit is disposed to communicate with the second memory channel. Sub-pages of a huge page having a larger size than a page are distributed across the first normal memory area and the second normal memory area. In response to a first command to frontswap-store the huge page in the compressed memory area, the first processing unit and the second processing unit are configured to compress the sub-pages by parallel processing the sub-pages.

In an embodiment, a memory management method of a memory device includes: receiving a first command to frontswap-store a huge page, which is stored in a normal memory area of a memory, in a compressed memory area of the memory; identifying addresses of sub-pages of the huge page based on an address of the huge page; compressing the sub-pages using the addresses of the sub-pages to generate compressed sub-pages; and storing the compressed sub-pages in the compressed memory area. A size of the huge page is larger than a regular page.

BRIEF DESCRIPTION OF THE DRAWINGS

The above and other aspects and features of the present disclosure will be more clearly understood from the following detailed description, taken in conjunction with the accompanying drawings, in which.

DETAILED DESCRIPTION

Figure 1:
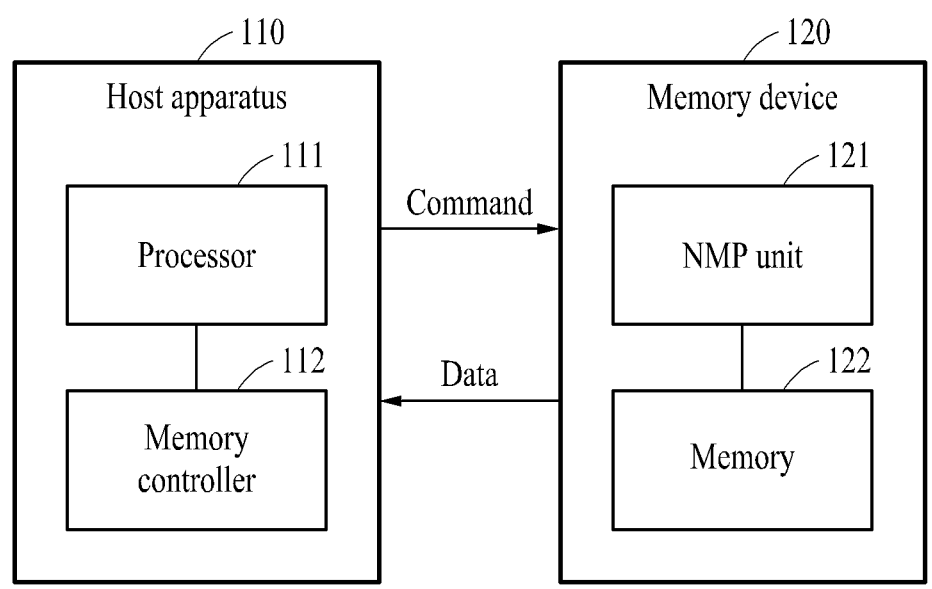
FIG. 1 is a block diagram schematically illustrating configurations of a host apparatus and a memory device, according to an embodiment.

Hereinafter, example embodiments of the present disclosure will be described with reference to the accompanying drawings. The present disclosure may, however, be embodied in many different forms and should not be construed as limited to the embodiments set forth herein. Like reference numerals refer to like elements throughout this application.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise.

As used herein, "at least one of A and B", "at least one of A, B, or C," and the like, each of which may include any one of the items listed together in the corresponding one of the phrases, or all possible combinations thereof.

FIG. 1 is a block diagram schematically illustrating configurations of a host apparatus and a memory device, according to an embodiment.

Referring to FIG. 1, a host apparatus 110 may include a processor 111 and a memory controller 112 (e.g., a controller circuit). The processor 111 may transmit instructions used by a memory device 120 while executing an operating system and an application program. The memory controller 112 may perform memory management related to the execution of the operating system and the application program.

The memory device 120 may include a near memory processing (NMP) unit 121 and a memory 122. The memory device 120 may operate based on instructions of the host apparatus 110. The memory device 120 may provide data to the host apparatus 110 as needed.

The memory 122 may store instructions (or programs) executable by the processor 111. For example, the instructions include instructions for performing an operation of the processor 111 and/or an operation of each component of the processor 111.

The memory 122 may be implemented as a volatile memory device or a non-volatile memory device.

The volatile memory device may be implemented as dynamic random-access memory (DRAM), static random-access memory (SRAM), thyristor RAM (T-RAM), zero capacitor RAM (Z-RAM), or twin transistor RAM (TTRAM).

The non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase-change RAM (PRAM), resistive RAM (RRAM), nanotube RRAM, polymer RAM (PoRAM), nano floating gate memory (NFGM), holographic memory, a molecular electronic memory device, or insulator resistance change memory.

The host apparatus 110 may manage memory of the memory device 120 by performing a swap. The swap may refer to a memory management method that prevents a memory shortage by moving a portion of memory allocated to an application program to an auxiliary storage device (e.g., a solid state drive (SSD) or a hard disk drive (HIDD)) with a relatively large capacity when a main memory area to be allocated to the application program is insufficient in a computing system.

The host apparatus 110 may manage the memory by performing a zSwap. zSwap is an example of compressed memory swap. A description of zSwap provided below may apply to a compressed memory swap method. zSwap may refer to a method of compressing and storing swap data in a predetermined area of main memory when a memory area is insufficient. For example, the compressed swap data may be stored in a predetermined area of a random-access-memory (RAM). In the zSwap method, the host apparatus 110 compresses data and stores the compressed data to be moved to a swap area in a zSwap pool area of the main memory; and when the data is required, the host apparatus 110 decompresses the compressed data and reuses the data from the main memory.

In a zSwap process, the host apparatus 110 may compress data and process an operation for managing a memory to store the compressed data to be located external to the host apparatus 110 in the memory or a near memory, thereby increasing the overall processing rate of an application program.

A NMP unit 121 may be spaced apart from the host apparatus 110. The NMP unit 121 may be implemented in the memory device 120 or near the memory device 120. Being implemented near the memory device 120 may indicate that the NMP unit 121 is implemented at a location that allows access to the data stored in the memory 122, not through a main data bus between the host apparatus 110 and the memory 122. When the NMP unit 121 is implemented near the memory 122, data may be quickly processed by processing the data without processing the data through a data bus between the host apparatus 110 and the memory 122. For example, the NMP unit 121 may positioned outside the memory device 120 and communicate with the memory 122 through a signal line different from the data bus.

The host apparatus 110 may be a main management agent of a computer system. The host apparatus 110 may be implemented as a personal computer or a server. The NMP unit 121 may process data of the memory 122 by interoperating or communicating with the host apparatus 110. The NMP unit 121 may control the memory 122 in response to a command from the host apparatus 110.

The NMP unit 121 may include a processing unit configured to process data. The processing unit may execute a computer-readable code (for example, software) stored in the memory and instructions triggered by the processor.

The processing unit may be a hardware-implemented data processing device having a circuit that is physically structured to execute desired operations. For example, the desired operations may include code or instructions included in a program.

The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The NMP unit 121 may receive a command from the host apparatus 110. The command may be a swap-in command or a swap-out command with respect to the data or compressed data stored in the memory 122. A command related to compression and decompression may include information indicating a frontswap-store or a frontswap-load. A detailed description of a swap command is provided below.

The NMP unit 121 may compress or decompress data in response to the command. The NMP unit 121 may manage an entry of the compressed data.

The NMP unit 121 may generate an entry tree configured in a tree structure or a hash structure based on the compressed data. The NMP unit 121 may manage the entry based on the entry tree.

The NMP unit 121 may include a buffer. The buffer may include at least one of an input buffer and an output buffer. The NMP unit 121 may receive information on data stored in the input buffer from the host apparatus 110 and may read the input buffer. The NMP unit 121 may write data to the output buffer and output information on the written data to a predetermined memory area. For example, the predetermined memory area may include a main memory area of the host apparatus 110, a second memory area such as a compute express link (CXL), or a memory area for near data processing (NDP).

In response to a swap-out command being received from the host apparatus 110, the NMP unit 121 may set a swap-out parameter based on the swap-out command. The swap-out parameter may include a type of the data, an offset of the data, and indicate whether to compress the data. The offset may be address information including page information.

The NMP unit 121 may determine whether to compress data based on the swap-out parameter. The NMP unit 121 may allocate an area to store the compressed data.

The NMP unit 121 may update the entry based on the swap-out parameter and the area to store the compressed data. The NMP unit 121 may generate the entry based on an address of the area to store the compressed data, a type of the data, and an offset of the data. The NMP unit 121 may update the entry by inserting the entry into the entry tree.

In response to a swap-in command being received from the host apparatus 110, the NMP unit 121 may set a swap-in parameter based on the swap-in command. The NMP unit 121 may retrieve the compressed data based on the swap-in parameter. The NMP unit 121 may retrieve the compressed data based on a type of the compressed data and an offset of the compressed data.

The NMP unit 121 may decompress the compressed data. The NMP unit 121 may decompress the compressed data based on a decompression option of the compressed data included in the swap-in parameter.

The NMP unit 121 may output the decompressed data to the host apparatus 110.

The NMP unit 121 may delete an entry corresponding to the decompressed data from the entry tree. For example, the NMP unit 121 may delete an entry corresponding to the decompressed data after the decompressed data has been output to the host apparatus 110.

The NMP unit 121 may store the data or the compressed data in a buffer based on the entry.

The NMP unit 121 may store the data or the decompressed data in a near memory area. The near memory area may refer to a storage space accessible by the NMP unit 121, not through the main data bus between the host apparatus 110 and the memory.

Figure 2:
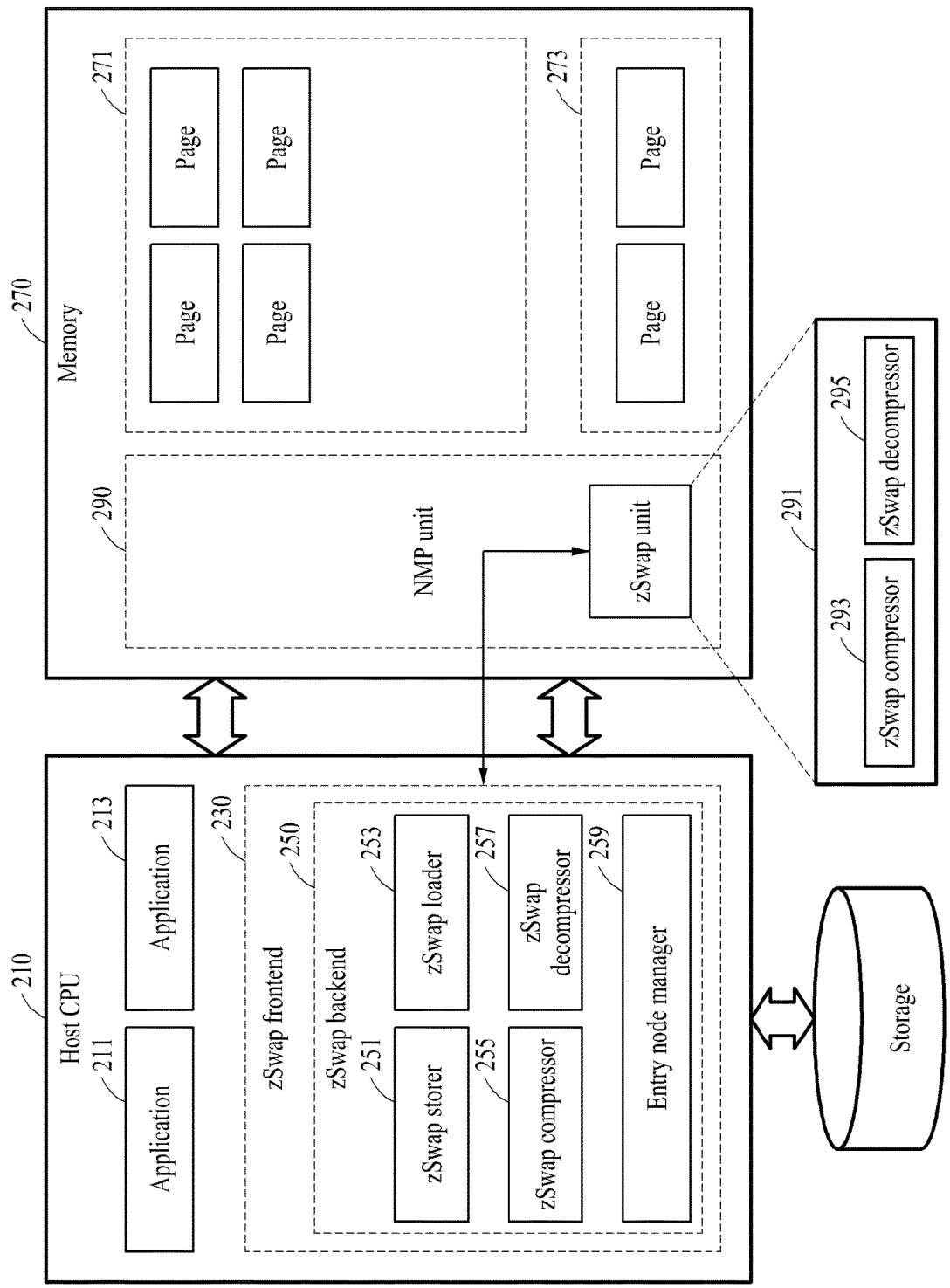
FIG. 2 is a block diagram of an example of detailed configurations of a host central processing unit (CPU) and a memory device.

FIG. 2 is a block diagram of an example of detailed configurations of a host central processing unit (CPU) and a memory device.

Referring to FIG. 2, a host CPU 210 may execute a plurality of application programs 211 and 213. The host CPU 210 may manage data in a memory device 270 to execute the plurality of application programs 211 and 213. The processor 111 may be implemented by the host CPU 210 and the memory device 120 may be implemented by the memory device 270.

The host CPU 210 may include a zSwap frontend interface 230 (e.g., a first interface circuit) and a zSwap backend interface 250 (e.g., a second interface circuit). The zSwap backend interface 250 may include a zSwap storer 251, a zSwap loader 253, a zSwap compressor 255, a zSwap decompressor 257, and an entry node manager 259. The zSwap storer 251, the zSwap loader 253, the zSwap compressor 255, the zSwap decompressor 257, and the entry node manager 259 may be logic circuits or programs executed by the Host CPU 210. When a zSwap unit 291 is dedicated to a zSwap-related operation, the zSwap compressor 255 and the zSwap decompressor 257 of the zSwap backend interface 250 may be omitted.

The memory device 270 may include an NMP unit 290, a normal memory area 271, and a compressed memory area 273. The NMP unit 290 may include the zSwap unit 291. The zSwap unit 291 may include a zSwap near data processing (NDP) backend. The zSwap NDP backend may include a zSwap compressor 293 and a zSwap decompressor 295. The zSwap NDP backend may optionally include a zSwap storer the same as 251, a zSwap loader the same as 253, and an entry node manager the same as 259. For example, the zSwap NDP backend may include at least one of the zSwap compressor 293, the zSwap decompressor 295, the zSwap storer 251, the zSwap loader 253, or the entry node manager 259.

The NMP unit 290 may operate in the same manner as the NMP unit 121 of FIG. 1.

Data of the plurality of application programs 211 and 213 may be stored in a main memory (e.g., the memory device 270) on a page basis (e.g., a 4-KB basis). When a portion of these pages is moved to the swap area, the data may be processed through the swap frontend interface 230. The host CPU 210 may process data by compressing and storing the data in the compressed memory area 273 of the main memory before the data is moved to an auxiliary storage device such as an SSD.

The NMP unit 290 may compress data using the zSwap compressor 293 in response to a zswap-offload-store command and store the compressed data in the memory (e.g., in memory area 273). The NMP unit 290 may use the entry node manager 259 to allocate a compressed memory area to store the data. The entry node manager 259 may include a zswap-alloc/tree module.

In a case where continuous memory demands from other devices cause a high memory load, the NMP unit 290 may secure a main memory area for an application program by moving the data stored in the compressed memory area 273 to an auxiliary swap area such as an SSD.

The NMP unit 290 may read compressed data stored in the compressed memory area 273 in response to a zswap-offload-load command and decompress the compressed data using the zSwap decompressor 295 to generate compressed data. The NMP unit 290 may move the decompressed data to a swap area of the auxiliary storage device according to the swap procedure of an operating system.

The NMP unit 290 may perform memory area management, compression, and decompression functions requiring a large memory bandwidth during the swap process. The NMP unit 290 may be positioned inside or close to the memory device 270 to perform the compression, decompression, and memory area management functions, thereby efficiently processing data.

For example, the NMP unit 290 may be implemented in a memory buffer of a dual in-line memory module (DIMM) to process data. In this case, the NMP unit 290 may process data while efficiently using the internal bandwidth of the DIMM.

The NMP unit 290 may distribute execution of computing functions such that a plurality of DIMMs may process data in parallel for each rank (e.g., a memory rank). Through this, the NMP unit 290 may prevent data access latency with respect to the compressed memory area 273 and effectively reduce external bus traffic.

The swap frontend interface 230 may use a zSwap acceleration function of the NMP unit 290 using the zSwap backend interface 250. The zSwap backend interface 250 may provide an interface for zSwap acceleration for compatibility with the operating system.

The zSwap backend interface 250 may provide a zSwap acceleration function using a command set (e.g., a zswap_frontswap_ops support command set).

The command set may include commands such as a zswap_offload_store, a zswap_offload_load, a zswap_offload_invalidate_page, a zswap_offload_invalidate_area, and a zswap_offload_init.

The NMP unit 290 may perform an operation of compressing data of a page to be swapped-out in response to the zswap_offload_store command and storing the compressed data in the compressed memory area 273. The NMP unit 290 may compress the data of the page to be swapped-out from the main memory using the zSwap compressor 293. The NMP unit 290 may allocate a space corresponding to a compressed size to the compressed memory using the entry node manager 259, and store the compressed data in the allocated space. The NMP unit 290 may update meta information of the compressed page through a zSwap-tree module of the entry node manager 259.

The NMP unit 290 may decompress data of a page to be swapped-in in response to the zswap_offload_load command and store the decompressed data in the main memory. The NMP unit 290 may search for a storage location of the compressed data to be swapped-in in the compressed memory area 273 using the zSwap-tree module. The NMP unit 290 may decompress the compressed data using the zSwap decompressor 295 and store the data in the main memory again. The NMP unit 290 may release a space corresponding to a compressed size from the compressed memory area 273 using the entry node manager 297 and initialize meta information of the swapped-in page.

The NMP unit 290 may delete meta information of the swapped-out page in response to the zswap_offload_invalidate_page command. The NMP unit 290 may search a swap area designated as a type, delete meta information of a page designated as an offset using the entry node manager 259, and release the allocated memory space.

The NMP unit 290 may generate one swap area in response to the zswap_offload_init command. The NMP unit 290 may release all the memory space allocated to the swap area designated as the type using the entry node manager 259.

Figure 3A:
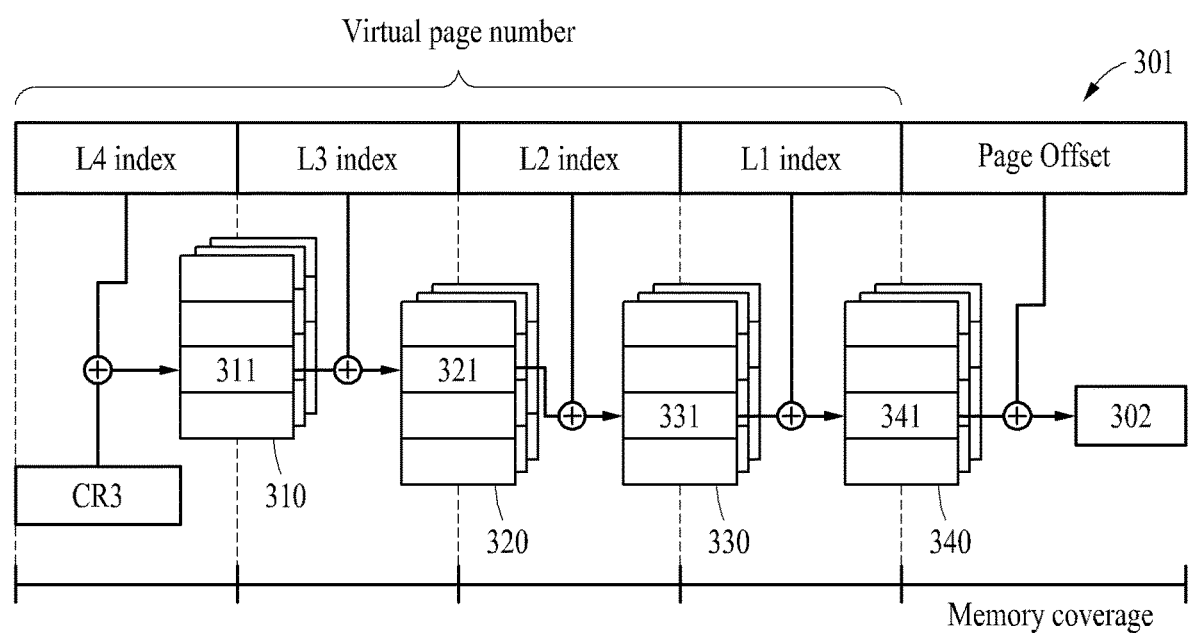
FIG. 3A illustrates an example of address data based on multi-level paging and a page table walk for the address data.

FIG. 3A illustrates an example of address data based on multi-level paging and a page table walk for the address data. Virtual memory may be managed based on multi-level paging. Virtual memory may be a memory management technique that allocates a memory area used for a process to a virtual address space rather than directly allocating the memory area to physical memory. The virtual address space may be an abstract memory area provided to a process and the process may read and write data using the virtual address space as if the process actually uses physical memory. Multi-level paging may be a virtual memory management technique using a hierarchical structure to convert a virtual memory address (hereinafter, referred to as a virtual address) into a physical memory address (hereinafter, referred to as a physical address).

Referring to FIG. 3A, a virtual address 301 may be converted into a physical address 302 by performing a page table walk based on multi-level paging. FIG. 3A illustrates an example of using a hierarchical structure having 4 levels, but embodiments of the disclosure are not limited thereto.

Each operation of a process may be performed in the unit of pages. The number of pages may be determined based on page size and the number of representable bits supported by the processor. For example, when the number of representable bits of the virtual address 301 is 48-bits, a virtual memory area of 256 terabyte (TB) that is $2^{48}$ bits may be represented through the virtual address 301. When the page size is 4 kilobyte (KB), 64 billion pages that is 256 TB/4 KB may be obtained. Since a page table supports as many indexes as the number of pages, 64 billion indexes may be included and the virtual address 301 may occupy an address space in a range of 0x00000000_00000000 to 0x0000ffff_ffffffff.

As described above, when using the virtual address 301 without a hierarchical structure, too much address space may be needed. Accordingly, the virtual address 301 may be managed using multi-level paging based on a page table having multiple levels. When using multi-level paging, a page table walk may be performed for each level of the hierarchical structure.

Referring to FIG. 3A, upper bits excluding a page offset of the virtual address 301 may be respectively assigned to levels of the hierarchical structure. For example, the number of representable bits of the virtual address 301 may be 48-bits and 9-bits may be assigned to each of L1 to L4 indexes. In this case, by using a total of 36-bits of indexes, a page table in the hierarchical structure having 4 levels may be operated. When a virtual page number is specified based on 4 levels of page table walk using the 36-bits of indexes of the virtual address 301, a page table entry (PTE) in a page table may be specified based on the virtual page number using the remaining 12-bits of page offset of the virtual address 301. In this case, a page offset may be 4 KB, and memory coverages of L1 to L4 indexes may be 2 megabyte (MB), 1 gigabyte (GB), 512 GB, and 256 TB, respectively.

When an entry of a data set (e.g., a table) of a level is specified based on an index of the level, the entry may be used as a pointer indicating a data set of a following level. For example, a first data set 310 may be constructed based on an L4 index of a first level and each entry of the first data set 310 may be used as a pointer indicating a second data set 320 of a second level.

A first base address of the first data set 310 may be stored in a CR3 register. A sum of the first base address and the L4 index may specify a first entry 311. The first entry 311 may specify a second base address of the second data set 320. Using the method as described above, a third entry 331 of a third data set 330 and a fourth entry 341 of a fourth data set 340 may be specified based on an L2 index and an L1 index. The third data set 330 may correspond to a page directory table 330 and the fourth data set 340 may correspond to a page table. The third entry 331 may correspond to a page directory entry (PDE) and the fourth entry 341 may correspond to a PTE. When a page is specified by the fourth entry 341, the physical address 302 in the page may be determined using a page offset.

In the LINUX operating system, the virtual address 301 may be converted into the physical address 302 through a page global directory (PGD) of the first level, a page upper directory (PUD) of the second level, a page mid-level directory (PMD) of the third level, and the PTE of the fourth level. When using multi-level paging, access to memory (or a device in which a page table is stored) in each operation may be needed. When the page size is 4 KB, a cache buffer miss may cause a memory access cost of 4 accesses.

Figure 3B:
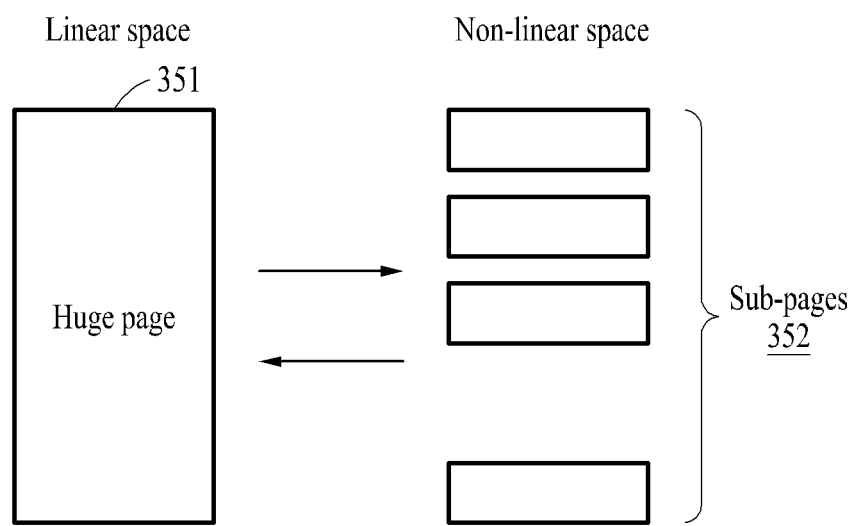
FIG. 3B illustrates an example of a conversion process of a huge page and sub-pages, according to an embodiment.

FIG. 3B illustrates an example of a conversion process of a huge page and sub-pages, according to an embodiment of the disclosure. A huge page 351 may have a larger size than a regular page. For example, a regular page may have a size of 4 KB, and a huge page 351 may have a size of 2 MB, however, embodiments of the disclosure are not limited thereto. The memory management efficiency may be increased by using the huge page 351 in a trend of increasing workload and memory capacity. For example, by using the huge page 351, the address conversion process may be simplified and a cache buffer hit rate may increase. However, because the huge page 351 has a larger size than a regular page, the memory efficiency may decrease when only a portion of the huge page 351 is used to store data.

According to an embodiment, a host apparatus (e.g., 110) performs address conversion on a level for managing the huge page 351 and a memory device (e.g., 120) performs address conversion on the remaining levels. For example, it may be assumed that the number of representable bits of the virtual address 301 of FIG. 3A is 48-bits, L1 to L4 indexes respectively use 9-bits, and a page offset uses 12-bits. In this case, the host apparatus may perform a first level of a page table walk using the L4 index, a second level of the page table walk using the L3 index, and a third level of the page table walk using the L2 index. As a result, an address conversion result of the host apparatus may indicate the huge page 351 of 2 MB. The memory device may find a PTE by performing a fourth level of the page table walk using the L1 index and may obtain a physical address by adding a page offset to an address value of the PTE. Accordingly, the memory device may prevent memory efficiency degradation and provide management convenience due to the use of the huge page 351.

The huge page 351 may be stored in a linear space having consecutive addresses. When the huge page 351 is split (e.g., split into sub-pages), sub-pages 352 of the huge page 351 may be stored in a non-linear space having an non-consecutive addresses. The sub-pages 352 may collapse and may be converted into the huge page 351 in the linear space.

When the huge page 351 exists in the linear space, data of the huge page 351 may be accessed through the physical address of the huge page 351. For example, the memory device may receive a request for the huge page 351 using a virtual address specifying the huge page 351 from the host device. The memory device may determine a page frame number from the virtual address and may determine the physical address of the huge page 351 using an offset value of the virtual address in the physical address of the huge page 351 of the page frame number. The memory device may access data of the huge page 351 using the physical address of the huge page 351.

When the huge page 351 is segmented and exists as the sub-pages 352 in the non-linear space, the respective physical addresses of the sub-pages 352 may need to be calculated. When a virtual address specifying the huge page 351 is received from the host device, the memory device may identify the page frame number of the virtual address. When a segmented state of the huge page 351 is identified based on the page frame number, the memory device may obtain a PTE and an offset value of the sub-pages 352 using the page frame number and may obtain a physical address of the sub-pages 352 by adding the offset value to an address of the PTE.

Figure 3C:
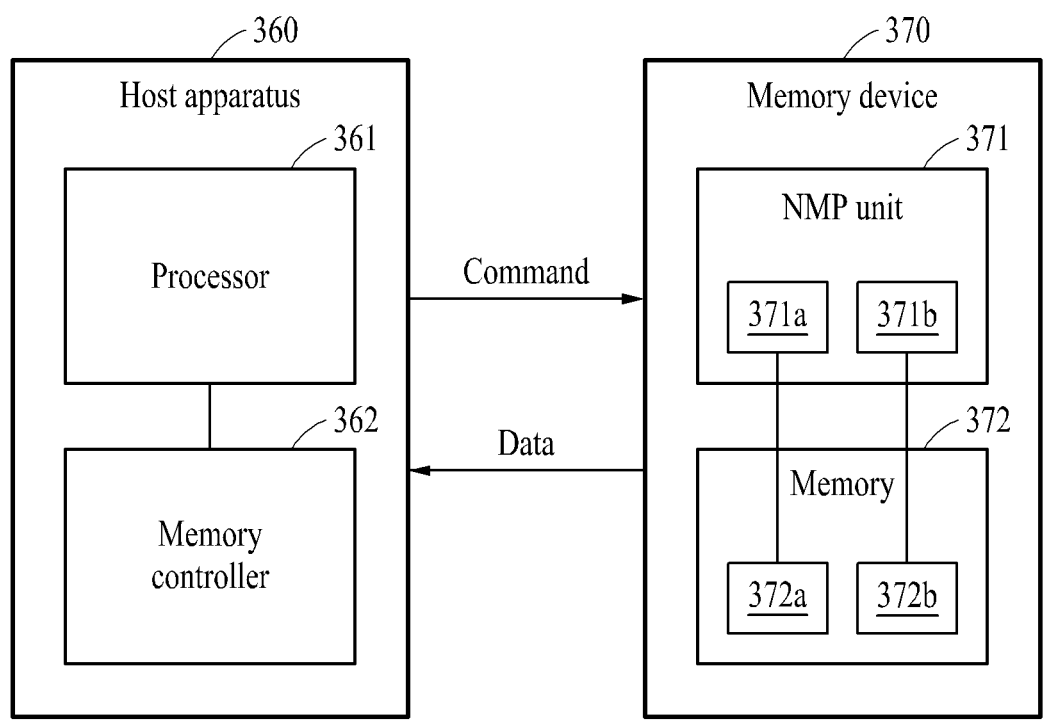
FIG. 3C illustrates a block diagram illustrating a multi-channel configuration of a memory device, according to an embodiment.

FIG. 3C illustrates a block diagram illustrating a multi-channel configuration of a memory device, according to an embodiment of the disclosure. Referring to FIG. 3C, a host apparatus 360 may include a processor 361 and a memory controller 362 and a memory device 370 may include an NMP unit 371 and a memory 372.

In an embodiment, the host apparatus 360 and the memory device 370 perform a zSwap in the unit of a huge page. The host apparatus 360 may instruct the memory device 370 to perform the zSwap in the unit of a huge page. The memory device 370 may mitigate overhead of the host apparatus 360 by offloading an operation for performing the zSwap in the unit of a huge page.

In an embodiment, the memory 372 includes a normal memory area for storing uncompressed data and a compressed memory area for storing compressed data. The performing of the zSwap may include performing a frontswap-store for compressing data (e.g., a page) in the normal memory area and storing the compressed data in the compressed memory area and performing a frontswap-load for decompressing data (e.g., a compressed page) in the compressed memory area and storing the decompressed data in the normal memory area.

When receiving a command to frontswap-store a huge page, which is stored in the normal memory area, in the compressed memory area, the NMP unit 371 may perform address management and compression on the huge page for frontswap-store. In an embodiment, the NMP unit 371 identifies addresses of sub-pages of the huge page, compresses the sub-pages using the identified addresses of the sub-pages, and stores the compressed sub-pages in the compressed memory area, in response to receiving the command to frontswap-store the huge page.

When a virtual address of the huge page is specified in response to the frontswap-store command, an address conversion operation of converting the virtual address into a physical address may be performed. The virtual address may be based on multi-level paging. A level of a hierarchical structure of multi-level paging may be performed by the host apparatus 360 and the remaining levels thereof may be performed by the memory device 370. The host apparatus 360 may perform address conversion on a level indicating a huge page. The NMP unit 371 may perform an address conversion on the remaining levels to generate a conversion result and may obtain a physical address corresponding to the conversion result.

The NMP unit 371 may identify the addresses of the sub-pages based on whether the addresses of the sub-pages of the huge page are consecutive. When the sub-pages are stored in a consecutive address space, the NMP unit 371 may determine an address of a following sub-page of the sub-pages by adding a sub-page size to an address of a current sub-page among the sub-pages. The sub-page size may be 4 KB, but is not limited thereto.

For example, a physical address of a huge page may correspond to a starting address. A physical address of a first sub-page of a huge page may correspond to a starting address. A physical address of a second sub-page may be obtained by adding a sub-page size to the starting address. A physical address of a third sub-page may be obtained by adding the sub-page size to the physical address of the second sub-page. The second sub-page may correspond to a following page of the first sub-page and the third sub-page may correspond to a following page of the second sub-page.

When the sub-pages are stored in an non-consecutive address space, the NMP unit 371 may obtain a page frame number of a following sub-page among the sub-pages by performing a page table walk and may determine an address of the following sub-page by adding a page offset of the following sub-page to the page frame number of the following sub-page. When the sub-pages are stored in the non-consecutive address space, consecutive addresses of the sub-pages are not obtained using the sub-page size and individual address conversion may be needed for each of the sub-pages. A page table walk of each sub-page of the huge page may be performed and as a result, a physical address corresponding to a virtual address of each sub-page may be obtained.

As described above, in both cases where the sub-pages are stored in the consecutive address space and the sub-pages are stored in the non-consecutive address space, the host apparatus 360 may need to perform address conversion on a huge page level and the remaining address conversion may be performed by the NMP unit 371. Accordingly, due to offloading of the NMP unit 371, overhead of the host apparatus 360 related to address management may decrease.

The NMP unit 371 may decrease the overhead of the host apparatus 360 related to compression by performing data compression for a frontswap-store. Data compression may be performed in parallel using a plurality of memory channels and thereby the compression speed may be increased.

More specifically, the memory 372 may include a first memory channel 372a and a second memory channel 372b. The sub-pages of the huge page may be distributed and stored in the first memory channel 372a and the second memory channel 372b and the NMP unit 371 may process the sub-pages, which are distributed and stored in the first memory channel 372a and the second memory channel 372b, in parallel and may compress the sub-pages. For example, the sub-pages of the huge page may be distributed across the first memory channel 372a and the second memory channel 372b.

In an embodiment, the NMP unit includes a first processing unit 371a disposed to communicate with the first memory channel 372a and a second processing unit 371b disposed to communicate with the second memory channel 372b. When a sub-page among the sub-pages is included in the first memory channel 372a, the sub-page may be compressed by the first processing unit 371a and when the sub-page is included in the second memory channel 372b, the sub-page may be compressed by the second processing unit 371b.

The first processing unit 371a may compress some of the sub-pages stored in the first memory channel 372a, and the second processing unit 371b may compress the other sub-pages stored in the second memory channel 372b. A compression operation of some sub-pages by the first processing unit 371a may be performed in parallel with a compression operation of the other sub-pages by the second processing unit 372b.

When receiving a command to frontswap-load a compressed huge page, which is stored in the compressed memory area, to the compressed memory area, the NMP unit 371 may perform address management and compression on the huge page for the frontswap-load. After the huge page is frontswap-stored in the compressed memory area, when a target sub-page of the huge page is requested, a frontswap-load command may be generated.

When receiving a frontswap-load command for a sub-page (also referred to as a target sub-page) of the huge page or a request for the target sub-page, the NMP unit 371 may provide the target sub-page to the host apparatus with higher priority than other sub-pages. For example, decompression of the compressed target sub-page may be performed prior to decompression of the remaining compressed sub-pages of the huge page.

The NMP unit 371 may determine a target frame number based on a difference between an address of the huge page and an address of the target sub-page, may determine an address of the compressed target sub-page in the compressed memory area based on the target frame number, may decompress the compressed target sub-page using the address of the compressed target sub-page, and may store the decompressed target sub-page in the normal memory area. For example, the NMP unit 371 may perform the above upon receiving a frontswap-load command for the sub-page of the huge page.

When the target sub-page of the huge page is priorly provided, the latency for the host apparatus to access the target sub-page may decrease compared to a case in which the target sub-page is accessible only after all sub-pages of the huge page have been decompressed. For example, providing a target sub-page of the huge page priorly may mean a portion of the compressed huge page associated with the target sub-page is decompressed before the rest is decompressed so it can be provided quickly to the host apparatus. In this case, when the NMP unit 371 decompresses a neighboring sub-page neighboring, around or adjacent the target sub-page, and the neighboring sub-page is processible in parallel, the latency for accessing the neighboring sub-page may decrease. In addition, like duplication processing of zSwap, a compressed memory area and a compression value corresponding to a decompressed page may be maintained without being removed and when swap-in is performed without updating the decompressed page in the future, an update of a compressed page may be omitted.

Figure 4:
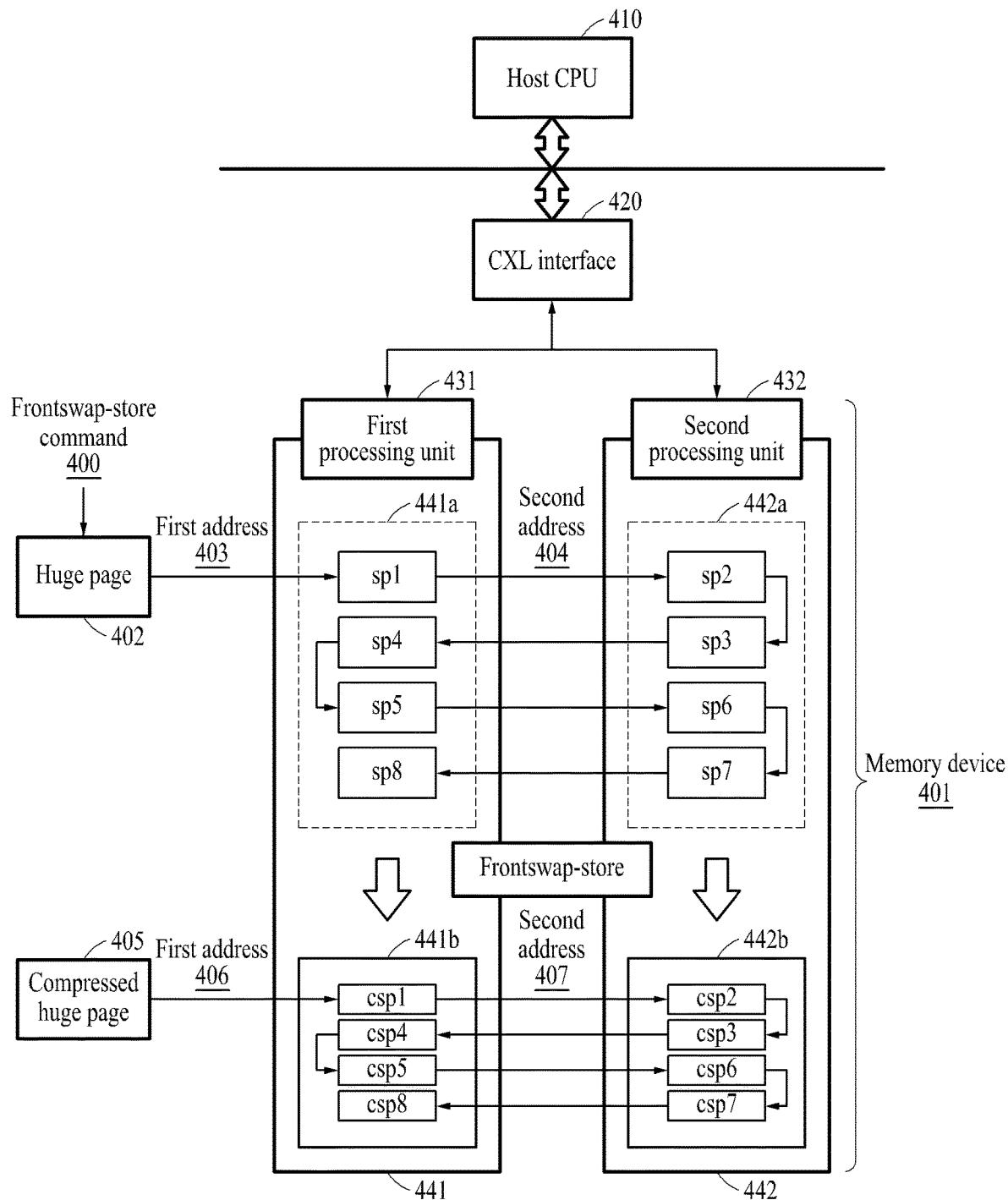
FIG. 4 is a block diagram illustrating an example of an operation of a memory device based on a frontswap-store command, according to an embodiment.

FIG. 4 is a block diagram illustrating an example of an operation of a memory device based on a frontswap-store command, according to an embodiment of the disclosure. Referring to FIG. 4, a memory device 401 may include a first processing unit 431, a first memory channel 441, a second processing unit 432, and a second memory channel 442. The memory device 401 may be connected to a host CPU 410 through a CXL interface 420 (e.g., an interface circuit). The host CPU 410 may be an example of a processor of a host apparatus. For example, the host CPU 410 may correspond to processor 111 or processor 361.

The first processing unit 431 and the second processing unit 432 may be included in an NMP unit. In an embodiment, the first memory channel 441 includes a first normal memory area 441a and a first compressed memory area 441b and the second memory channel 442 includes a second normal memory area 442a and a second compressed memory area 442b.

Sub-pages sp1 to sp8 of a huge page 402 may be stored in the normal memory areas 441a and 441b. The sub-pages sp1 to sp8 may be stored in the normal memory areas 441a and 441b in an interleaved manner. The processing units 431 and 432 may identify physical addresses of the sub-pages sp1 to sp8 based on an address of the huge page 402, may compress the sub-pages sp1 to sp8 using the physical addresses of the sub-pages sp1 to sp8, and may store compressed sub-pages csp1 to csp8 of a compressed huge page 405 in the compressed memory areas 441b and 442b. For example, the compressed sub-pages csp1 to csp8 may be stored in the compressed memory areas 441b and 442b in an interleaved manner.

The host CPU 410 may perform some operations to specify the huge page 402 for performing address conversion operations of multi-level paging and the remaining operations may be performed by the CXL interface 420 and/or the memory device 401. In addition, the CXL interface 420 and/or the memory device 401 may perform task distribution to the memory channels 441 and 442 based on the physical addresses of the sub-pages sp1 to sp8. When address conversion and/or task distribution is performed by the memory device 401, address conversion may be performed by an NMP unit (e.g., an additional processing unit other than the processing units 431 and 432 may exist)

and/or a separate controller (e.g., a buffer chip (e.g., a dual in-line memory module (DIMM) buffer chip)). On the other hand, without a separate task distribution agent, task distribution may be performed based on a predetermined rule, such as an interleaved manner. The processing units 431 and 432 may identify physical addresses of the sub-pages sp1 to sp8 based on the address conversion result and may compress the sub-pages sp1 to sp8 using the physical addresses of the sub-pages sp1 to sp8.

The memory device 401 may determine the physical addresses of the sub-pages sp1 to sp8 based on the physical address of the huge page 402 specified by a frontswap-store command 400. The memory device 401 may determine the physical address of the huge page 402 through address conversion (e.g., a page table walk) on the virtual address of the huge page 402. For example, the frontswap-store command 400 may specify the virtual address of the huge page 402. The address conversion may correspond to a portion of the address conversion operations of multi-level paging. A first address 403 of the huge page 402 may correspond to the physical address of the huge page 402. The first address 403 may be referred to as a starting address. When the huge page 402 exists in a consecutive memory address space, a second address 404 of the huge page 402 may be determined based on a sum of the first address 403 and a sub-page size. When the huge page 402 does not exist in the consecutive memory address space, a separate address conversion operation may be used to determine the second address 404. The second address 404 may be derived by performing address conversion on a virtual address of a second sub-page of the huge page 402.

When the compressed huge page 405 exists in the consecutive memory address space, similar to address conversion on the huge page 402, a second address 407 of the compressed huge page 405 may be derived based on a first address 406 of the compressed huge page 405. In this case, the respective sizes of the compressed sub-pages csp1 to csp8 may be used. For example, the second address 407 of the compressed huge page 405 may be determined based on a sum of the first address 406 and a size of a compressed sub-page.

Figure 5:
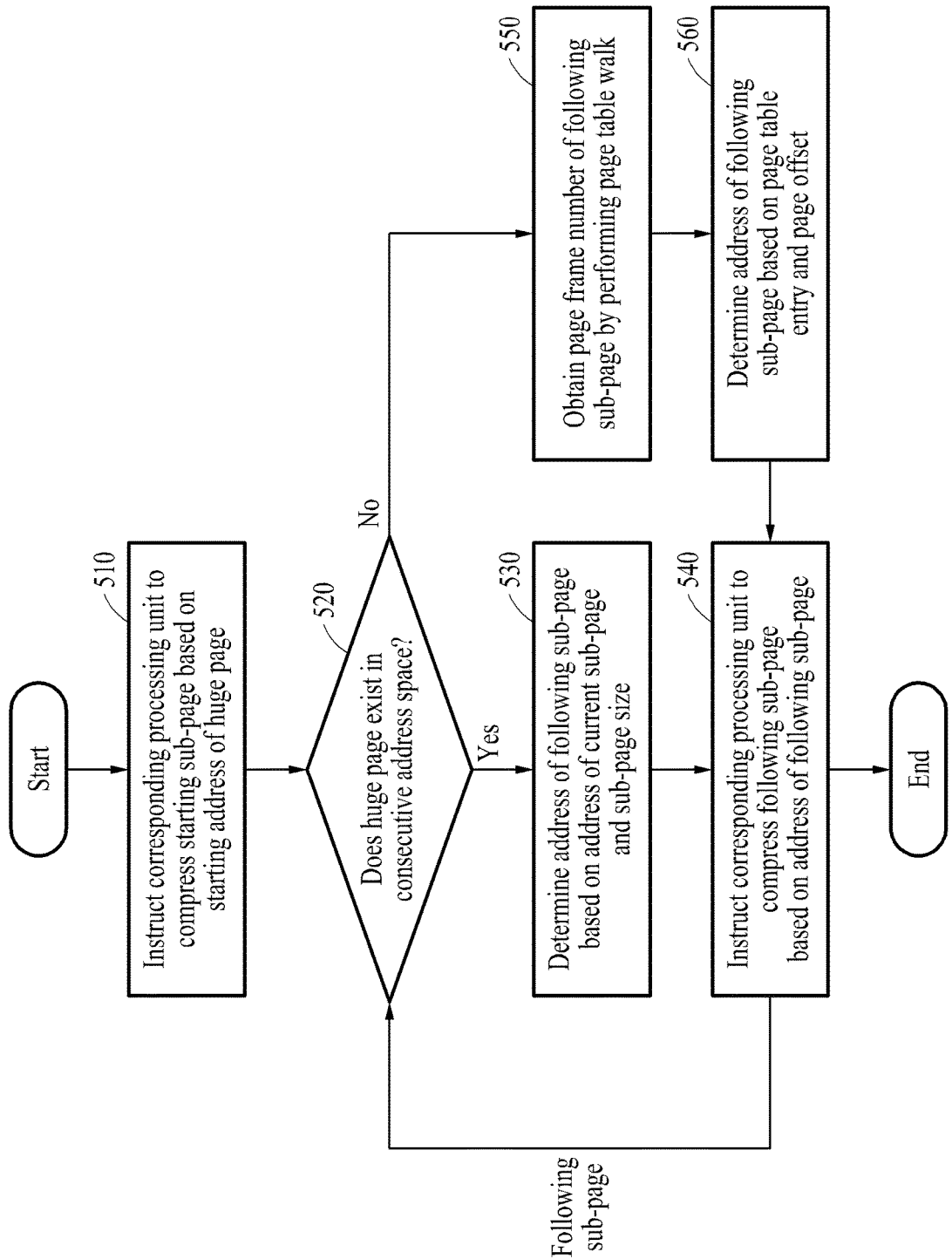
FIG. 5 is a flowchart illustrating an example of operations for performing a frontswap-store according to an embodiment.
Figure 7:
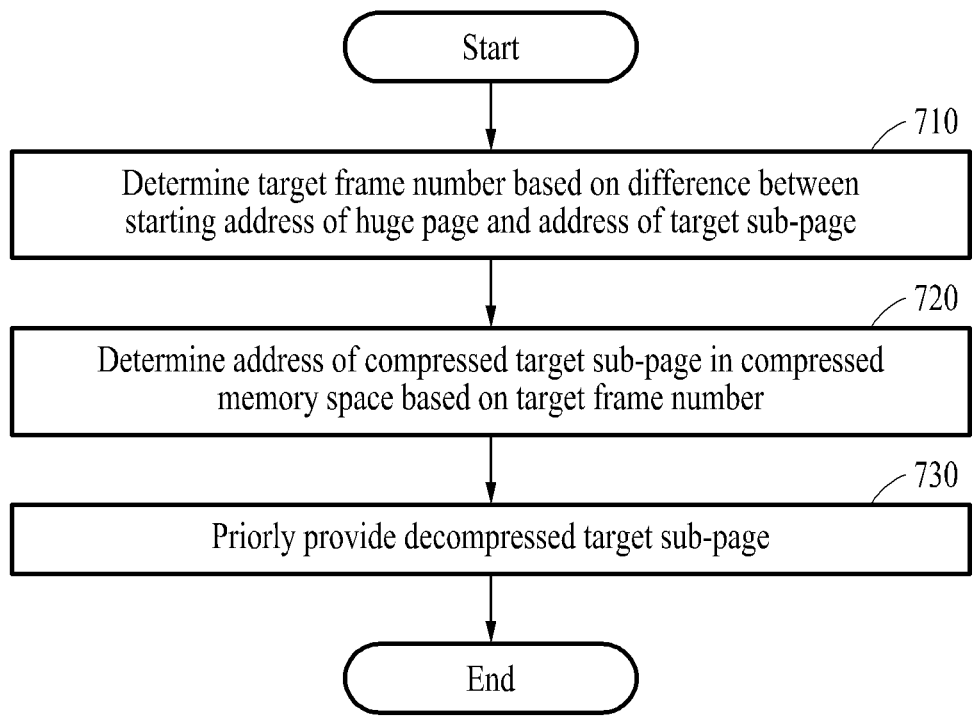
FIG. 7 illustrates a flowchart illustrating an example of operations for performing a frontswap-load, according to an embodiment.

FIG. 5 is a flowchart illustrating an example of operations for performing a frontswap-store according to an embodiment of the disclosure. Referring to FIG. 7, in operation 510, a compression command of a starting sub-page may be transmitted to a corresponding processing unit based on a starting address of a huge page. For example, when the starting sub-page of the huge page is stored in a first memory channel, the starting sub-page may be compressed by a first processing unit disposed to communicate with the first memory channel.

In operation 520, whether the huge page exists in a consecutive address space is determined. When the huge page exists in the consecutive address space, in operation 530, an address of a following sub-page is determined based on an address of a current sub-page and a sub-page size. For example, the address of the following sub-page may correspond to a sum of the address of the current sub-page and the sub-page size. The address of the current sub-page may correspond to the starting address or be determined from the starting address. In operation 540, a compression command for the following sub-page may be transmitted to a corresponding processing unit based on the address of the following sub-page.

When the huge page does not exist in the consecutive address space, in operation 550, a page frame number of the following sub-page is obtained by performing a page table walk. In operation 560, the address of the following sub-page is determined based on a page table entry and a page offset. The page table entry and the page offset may be determined using the page frame number. In operation 540, a compression command for the following sub-page may be transmitted to a corresponding processing unit based on the address of the following sub-page. In an embodiment, if a zSwap needs to be performed on a regular page based on a frontswap-store command, instead of the NMP unit (e.g., 371) handling the zSwap, the host CPU 210 handles the zSwap. For example, the host CPU 210 can use its zSwap compressor 255 to compress the regular page for storage in the compressed memory area 273. In an embodiment, if zSwap needs to be performed on a regular page based on a frontswap-load command, instead of the NMP unit (e.g., 371) handling the zSwap, the host CPU 210 handles the zSwap. For example, the host CPU 210 can use its zSwap decompressor 257 to decompress the compressed regular page stored in the normal memory area 271.

Figure 6:
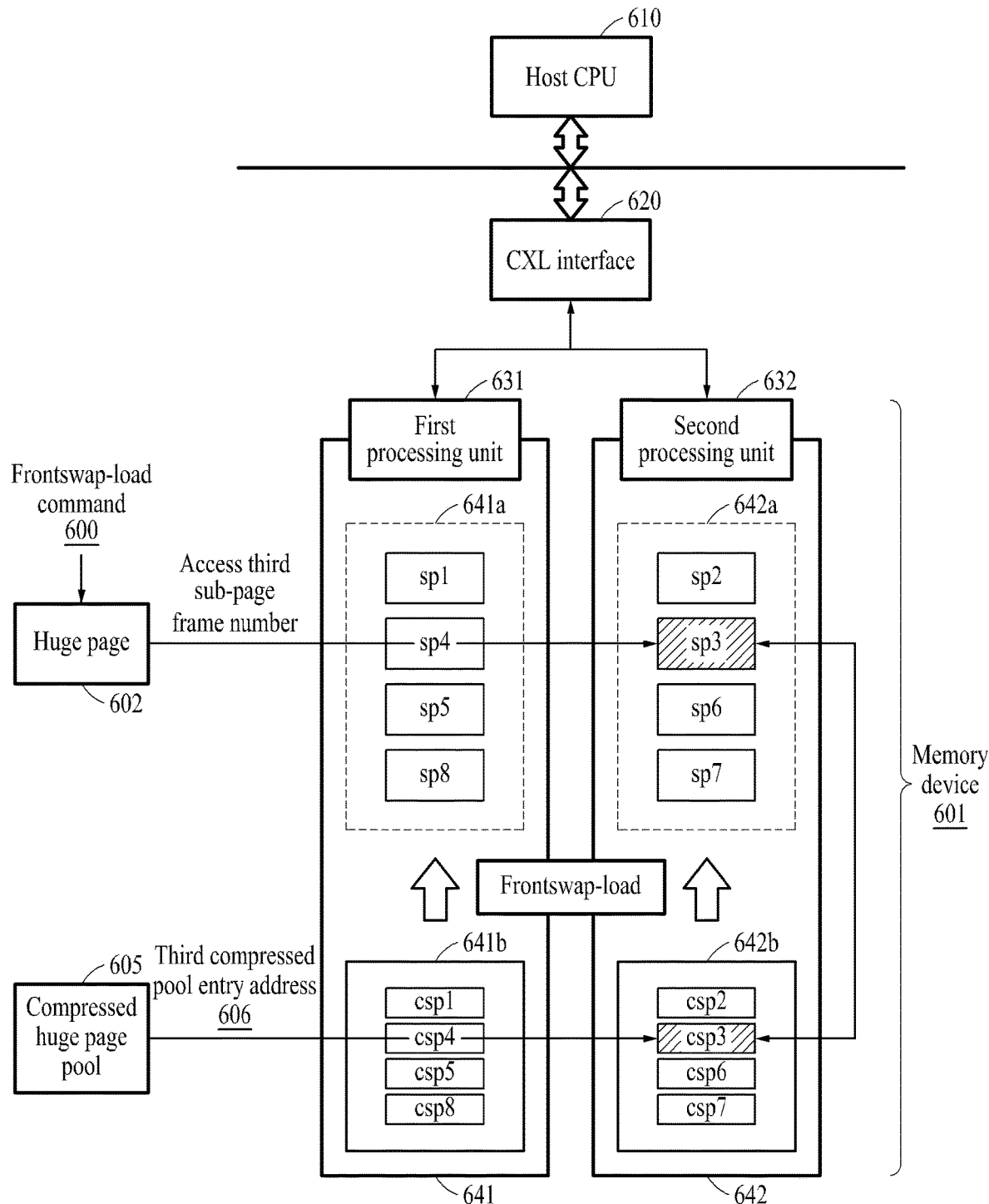
FIG. 6 is a block diagram illustrating an example of an operation of a memory device based on a frontswap-load command, according to an embodiment.

FIG. 6 is a block diagram illustrating an example of an operation of a memory device based on a frontswap-load command, according to an embodiment of the disclosure. Referring to FIG. 6, a memory device 601 may include a first processing unit 631, a first memory channel 641, a second processing unit 632, and a second memory channel 642. The memory device 601 may be connected to a host CPU 610 through a CXL interface 620. The host CPU 610 may be an example of a processor of a host apparatus. For example, the host CPU 610 may correspond to processor 111 or processor 361.

The first processing unit 631 and the second processing unit 632 may be included in an NMP unit. In an embodiment, the first memory channel 641 includes a first normal memory area 641*a* and a first compressed memory area 641*b* and the second memory channel 642 includes a second normal memory area 642*a* and a second compressed memory area 642*b*.

Sub-pages sp1 to sp8 of a huge page 602 may be stored in the normal memory areas 641*a* and 642*a*. The NMP unit may receive a frontswap-load command 600 requesting a target sub-page (e.g., the sub-page sp3) of the huge page 602 after the huge page 602 is frontswap-stored in the compressed memory areas 641*b* and 642*b*. The NMP unit may determine a target frame number based on a starting physical address of the huge page 602 and a physical address of the target sub-page and may determine a physical address of a compressed target sub-page (e.g., a compressed sub-page scp3) of the compressed memory areas 641*b* and 642*b* based on the target frame number. The second processing unit 632 may decompress the compressed target sub-page using a physical address of the compressed target sub-page (e.g., the compressed sub-page scp3) and may store the decompressed target sub-page (e.g., the sub-page sp3) in the normal memory area (e.g., the second normal memory area 642*a*). A compressed huge page pool 605 may store information on compressed sub-pages and a physical address of a compressed target sub-page, such as a third compressed pool entry address 606, may be secured from the compressed huge page pool 605.

FIG. 7 illustrates a flowchart illustrating an example of operations for performing a frontswap-load, according to an embodiment of the disclosure. Referring to FIG. 7, in operation 710, a target frame number is determined based on a difference between a starting address of a huge page and an address of a target sub-page. For example, a difference value may be determined based on a difference between a physical address of the target sub-page and a starting physical address of the huge page and the target frame number may be determined based on a result obtained by dividing the difference value by a sub-page size. In operation 720, a physical address of a compressed target sub-page in a compressed memory space is determined based on the target frame number. A compressed huge page pool for storing information on compressed sub-pages may exist and a physical address of the compressed target sub-page corresponding to the target frame number may be extracted from the compressed huge page pool. In operation 730, a decompressed target sub-page is priorly provided. For example, the compressed target sub-page using the physical address of the compressed target sub-page may be decompressed prior to the other compressed sub-pages. For example, the target sub-page of a huge page may be decompressed and output to the Host CPU 610 before the other sub-pages of the same huge page are decompressed.

Figure 8:
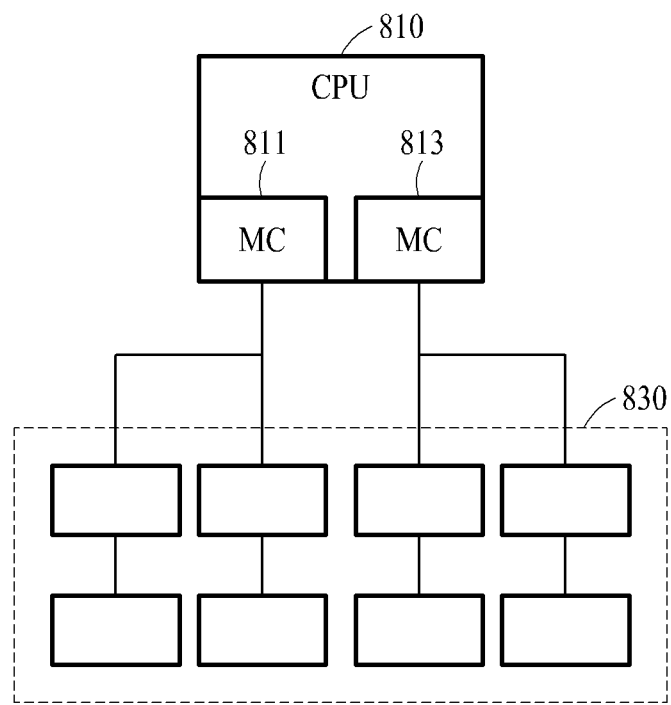
FIG. 8 illustrates an example of a CPU-based zSwap dual in-line memory module (DIMM) acceleration structure, according to an embodiment.
Figure 9:
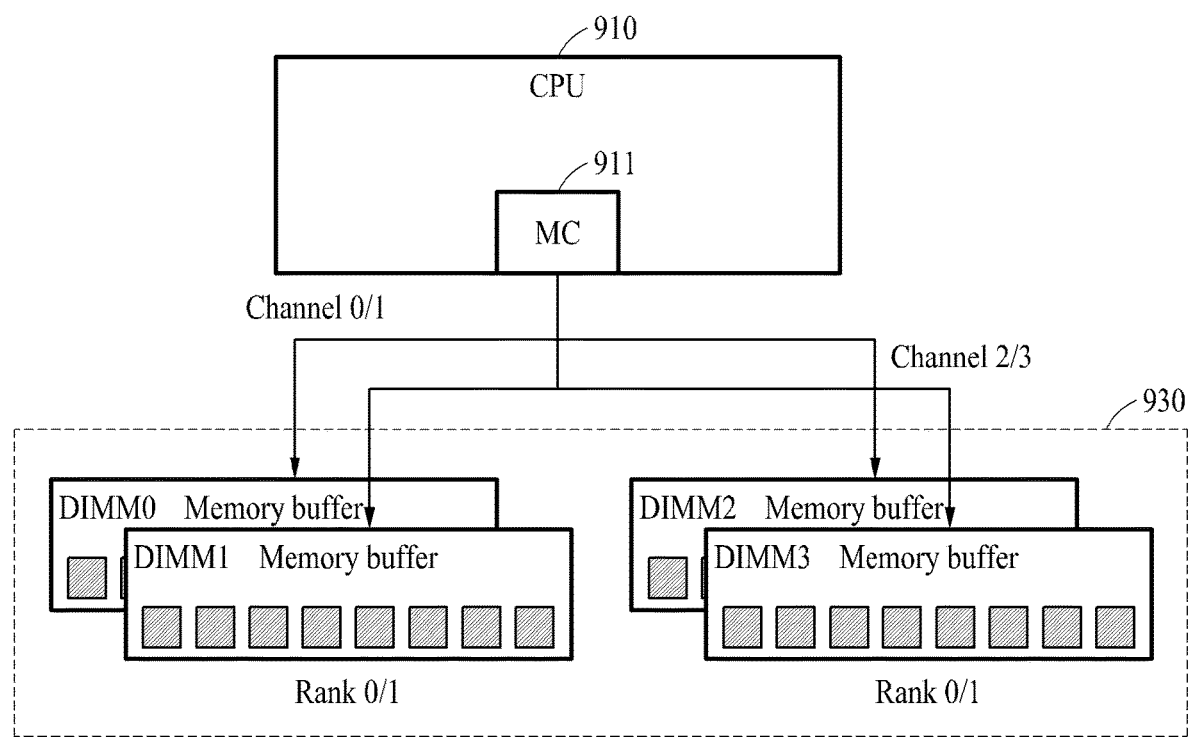
FIG. 9 illustrates a DIMM-based multi-rank structure, according to an embodiment.

FIG. 8 illustrates an example of a CPU-based zSwap DIMM acceleration structure according to an embodiment of the disclosure and FIG. 9 illustrates an example of a DIMM-based multi-rank structure according to an embodiment of the disclosure.

Referring to FIGS. 8 and 9, a host may be implemented as a CPU 810. The CPU 810 may include a plurality of memory controllers 811 and 813 (e.g., controller circuits). The CPU 810 may process data stored in a plurality of memory modules 830 through the plurality of memory controllers 811 and 813.

When a main memory includes the plurality of memory modules 830 capable of AXDIMM zSwap acceleration, the zSwap acceleration performance may be enhanced in proportion to the number of memory modules 830.

In the example of FIG. 8, the two memory controllers 811 and 813 may be provided with two DIMMs (or AXDIMMs) per channel, such that the CPU 810 may set a zSwap area for each DIMM, thereby performing zSwap acceleration in up to four DIMMs.

In the example of FIG. 9, a CPU 910 may include one memory controller 911 (e.g., a controller circuit). The CPU 910 may process data in a plurality of memory modules 930 through the one memory controller 911.

Depending on the CPU 810 or 910 and the board configuration, the topology of mountable DIMMs may vary.

A data processing apparatus (e.g., the data processing apparatus 10 of FIG. 1) may be configured inside or close to a memory module, thereby performing scalable AXDIMM zSwap acceleration in various configurations.

For scalable zSwap acceleration in various configurations, a zSwap backend interface of the host may generate a command separately for each DIMM accelerator unit mapped to a system memory, and input the generated command to a corresponding DIMM accelerator unit to operate the DIMM accelerator unit.

Figure 10:
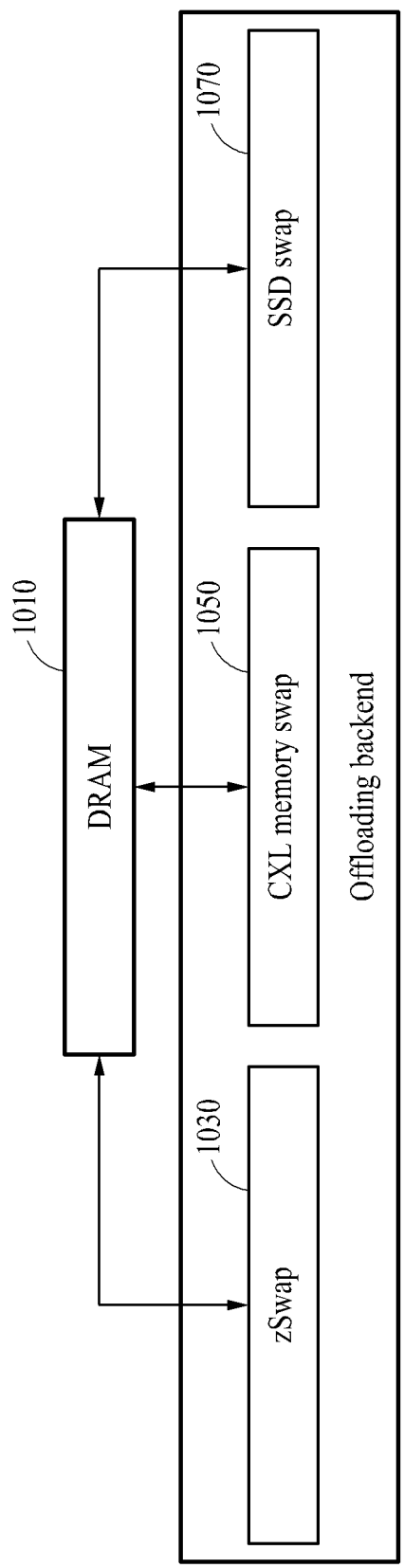
FIGS. 10 to 12 illustrate examples of zSwap structures in a heterogeneous memory, according to an embodiment.
Figure 11:
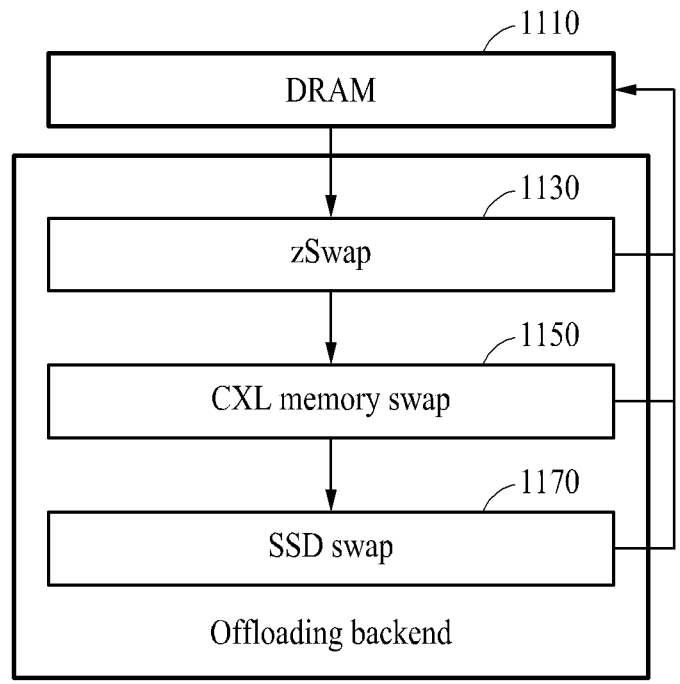
Figure 12:
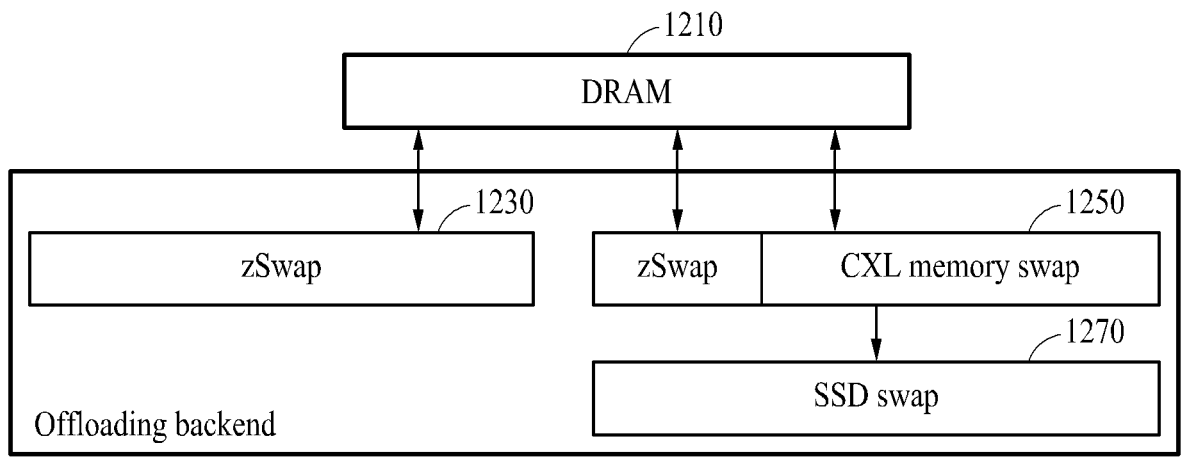

FIGS. 10 to 12 illustrate examples of zSwap structures in a heterogeneous memory, according to an embodiment of the disclosure. Referring to FIGS. 10 to 12, a zSwap structure in a heterogeneous memory may include a flat structure, a multi-level structure, and a hybrid structure.

The flat structure may be a structure in which a DRAM 1010, a zSwap 1030, a CXL memory swap 1050, and an SSD swap 1070 are arranged in a single layer. The flat structure may directly perform offloading to predetermined backends. For example, the DRAM 1010 may perform offloading of each of the zSwap 1030, the CXL memory swap 1050, and the SSD swap 1070.

The multi-level structure may be a structure in which offloading backends are arranged in several layers according to performance. For example, a zSwap 1130 may be disposed on a lower layer of the DRAM 1110, a CXL memory swap 1150 may be disposed on a lower layer of the zSwap 1130, and an SSD swap 1170 may be disposed on a lower layer of the CXL memory swap 1150. In this case, offloading may be sequentially performed according to the layers. In the example of FIG. 11, offloading may be performed in the order of the DRAM 1110, the zSwap 1130, the CXL memory swap 1150, and the SSD swap 1170.

As shown in FIG. 12, the hybrid structure may be a structure in which a flat structure and a multi-level structure are mixed. In this case, a zSwap 1230 and a CXL memory swap 1250 may be configured in a flat structure, and the CXL memory swap 1250 and an SSD swap 1270 may be configured in a multi-level structure.

A data processing apparatus (e.g., the NMP unit 121 of FIG. 1) may offload all or a portion of functions for zSwap acceleration to a plurality of near memory acceleration units through various types of hierarchical structures, thereby accelerating zSwap.

Figure 13:
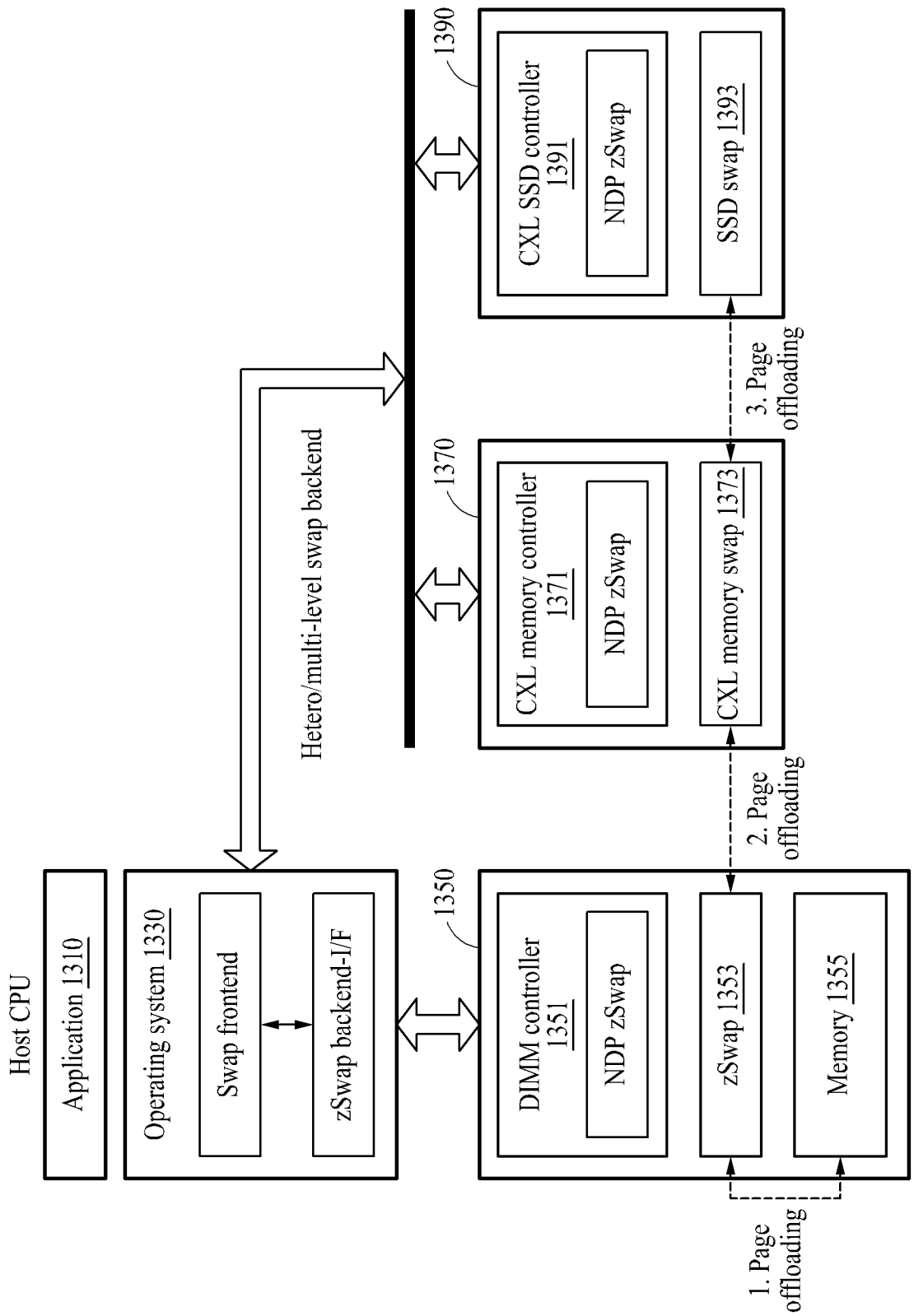
FIG. 13 illustrates an example of a multi-level swap backend configuration, according to an embodiment.

FIG. 13 illustrates an example of a multi-level swap backend configuration, according to an embodiment of the disclosure. Referring to FIG. 13, a host CPU may execute an application 1310 and an operating system 1330. The host CPU may perform zSwap acceleration through a plurality of memory modules (e.g., memory modules 1350, 1370, and 1390) having a multi-level backend structure.

The memory module 1350 may be implemented as a DIMM memory. The memory module 1350 may include a DIMM controller 1351, a zSwap area 1353, and a memory 1355. The DIMM memory module 1370 may be implemented as a CXL memory. The memory module 1370 may include a CXL memory controller 1371 and a CXL memory swap area 1373. The memory module 1390 may be implemented as a CXL/SSD memory. The memory module 1390 may include a CXL/SSD controller 1391 and an SSD swap area 1393.

The example of FIG. 13 may be an example of a multi-level swap backend configuration that utilizes CXL. In the example of FIG. 13, a DIMM may be used as a main memory, a CXL memory may be used as a secondary main memory, and a CXL/SSD may be used as a storage.

The zSwap area 1353, which is a compressed memory area, may be used as a partial area of the DIMM. The DIMM controller 1351 may use a dedicated accelerator unit (e.g., the NMP unit 121 of FIG. 1) for zSwap acceleration. Of pages of a memory, a page to be swapped-out may be first compressed in an NMP zSwap of the DIMM through the zSwap 1353 and stored in a zpool, which is a compressed memory area.

When the compressed memory area is insufficient due to an increase in the memory load, the DIMM controller 1351 may select the least accessed pages from among the pages allocated to the compressed memory and evict the selected pages to the CXL memory swap area 1373. In this case, the DIMM controller 1351 may reduce the memory bandwidth by transmitting the compressed pages from the zSwap area 1353 to the CXL memory.

Compressed data may be decompressed by the NMP of the CXL controller 1371 and then stored in the CXL memory swap area 1373. The CXL controller 1371 may transmit the compressed pages to the CXL memory, and the CXL memory may decompress and store the pages. Through this, the CXL controller 1371 may prevent the corresponding memory from decompressing data when the memory is swapped in to be used in an application program in the future, thereby reducing a degradation of the performance of the application program. The swap-in procedure may affect the performance of the application program. The swap-out procedure may be executed in the background asynchronously with the execution of the application program.

When the capacity is insufficient as the memory load of the swap space of the CXL memory increases, the CXL controller 1371 may evict less accessed pages to the swap area 1393 of the CXL/SSD and secure free space of the CXL memory, thereby preserving the performance.

Figure 14:
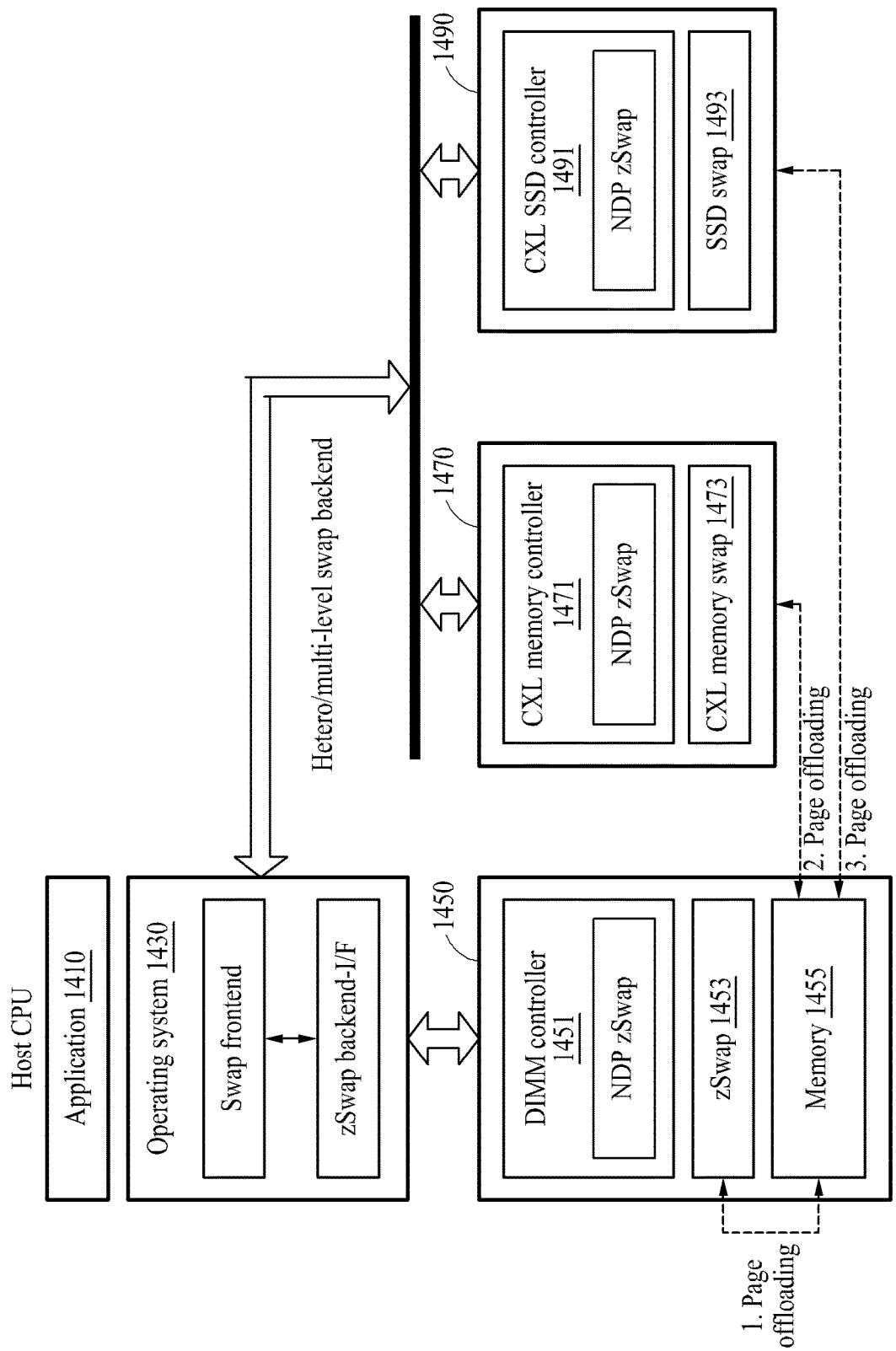
FIG. 14 illustrates an example of a flatswap backend configuration, according to an embodiment.

FIG. 14 illustrates an example of a flatswap backend configuration, according to an embodiment of the disclosure. Referring to FIG. 14, a host CPU may execute an application 1410 and an operating system 1430. The host CPU may perform zSwap acceleration through a plurality of memory modules (e.g., memory modules 1450, 1470, and 1490) having a multi-level backend structure.

The memory module 1450 may be implemented as a DIMM memory. The memory module 1450 may include a DIMM controller 1451, a zSwap area 1453, and a memory 1455. The DIMM memory module 1470 may be implemented as a CXL memory. The memory module 1470 may include a CXL memory controller 1471 and a CXL memory swap area 1473. The memory module 1490 may be implemented as a CXL/SSD memory. The memory module 1490 may include a CXL/SSD controller 1491 and an SSD swap area 1493.

As shown in the example of FIG. 14, a flat swap backend structure may be implemented using a CXL memory. In this case, a DIMM memory, a CXL memory, and a CXL/SSD memory may be used as swap devices of the same level.

The DIMM memory, the CXL memory, and the CXL/SSD memory may have access latency differences according to characteristics of the respective devices and interfaces (e.g., a double data rate (DDR) bus and a peripheral component interconnect express (PCIe)) connected thereto. The DIMM closest to the host CPU may have the shortest access latency, and then, the CXL memory and the CXL/SSD may have shorter access latencies in that order.

To minimize the effect of the difference in the performance of swap devices on the performance of an application program, offloading may be allocated to an appropriate swap device in consideration of the access characteristics of pages to be swapped-out.

For example, pages may be divided into three parts, which are as many as the swap devices, according to the access frequencies of the swap-out pages, and a page with the highest access frequency (e.g., a hot page) may be allocated to the zSwap area 1453 of the DIMM which is the fastest. A page with the lowest access frequency (e.g., a cold page) may be stored in the SSD swap area 1493 which is the slowest.

Warm pages having access frequencies between the access frequency of the hot page and the access frequency of the cold page may be stored in the CXL memory swap area 1473 located in the middle. By allocating the pages to the swap devices separately according to the access frequencies of the pages, a degradation of the performance of an application program occurring due to access to a slow device may be minimized.

In a flat swap backend configuration, a compression function may be applied differently depending on the probability that swapped-out pages are accessed again. For example, hot pages stored in the zSwap area 1453 of the DIMM which is the fastest have a high probability of being accessed again and thus, may be stored without compression, whereby the access latency may be minimized. Conversely, warm pages or cold pages having a low probability of being accessed again may be compressed and stored in respective swap areas.

Figure 15:
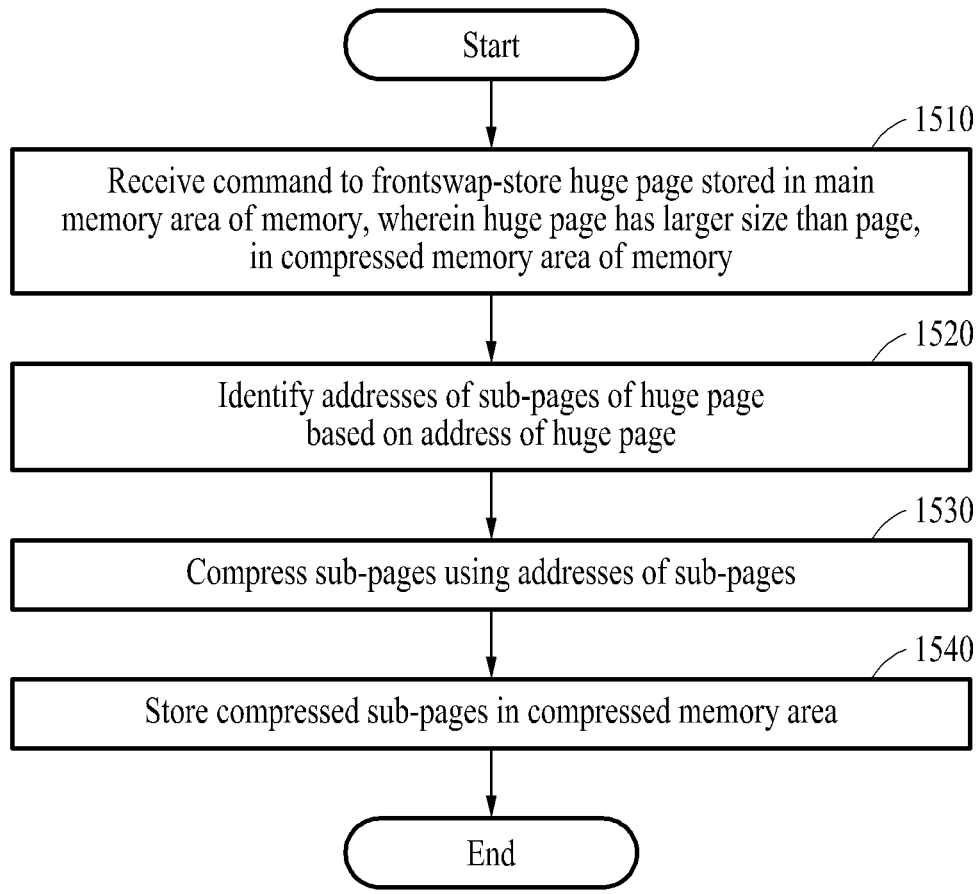
FIG. 15 is a flowchart illustrating a memory management method of a memory device according to an embodiment.

FIG. 15 is a flowchart illustrating a memory management method of a memory device according to an embodiment of the disclosure. Referring to FIG. 15, in operation 1510, a memory device receives a first command to frontswap-store a huge page stored in a normal memory area of a memory. The huge page may have a larger size than a page, in a compressed memory area of the memory. In operation 1520, the memory device identifies addresses of sub-pages of the huge page based on an address of the huge page. In operation 1530, the memory device compresses the sub-pages using the addresses of the sub-pages. In operation 1540, the memory device stores the compressed sub-pages in the compressed memory area.

Operation 1520 may include an operation of determining an address of a following sub-page of the sub-pages by adding a sub-page size to an address of a current sub-page of the sub-pages when the sub-pages are stored in a consecutive address space.

Operation 1520 may include an operation of obtaining a page frame number of the following sub-page of the sub-pages by performing a page table walk when the sub-pages are stored in a non-consecutive address space and an operation of determining the address of the following sub-page by adding a page offset of the following sub-page to the page frame number of the following sub-page.

The memory device may further perform an operation of receiving a second command requesting a target sub-page of the huge page after the huge page is frontswap-stored in the compressed memory area, an operation of determining a target frame number based on a difference between the address of the huge page and the address of the target sub-page, an operation of determining an address of the compressed target sub-page in the compressed memory area based on the target frame number, an operation of decompressing the compressed target sub-page using the address of the compressed target sub-page, and an operation of storing the decompressed target sub-page in the normal memory area.

The memory may include a first memory channel and a second memory channel and the sub-pages of the huge page may be distributed and stored in the first memory channel and the second memory channel. Operation 1530 may include an operation of processing, in parallel, the sub-pages distributed and stored in the first memory channel and the second memory channel and compressing the sub-pages.

The memory device may further perform an operation of identifying the memory channels including the sub-pages based on the addresses of the sub-pages, compressing a sub-page using a first processing unit disposed to communicate with the first memory channel when the sub-page is included in the first memory channel, and an operation of compressing a sub-page using a second processing unit disposed to communicate with the second memory channel when the sub-page is included in the second memory channel.

In addition, the descriptions provided with reference to FIGS. 1 to 14 may apply to the memory management method of FIG. 15.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable-gate-array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purpose of implementing the above-described embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

The foregoing is illustrative of example embodiments and is not to be construed as limiting thereof. Although a few example embodiments have been described, those skilled in the art will readily appreciate that many modifications are possible in the example embodiments without materially departing from the teachings of the present disclosure. Accordingly, all such modifications are intended to be included within the scope of the present disclosure.

What is claimed is:

1. A memory device comprising:
a memory comprising a normal memory area for storing uncompressed data and a compressed memory area for storing compressed data; and
a near memory processing unit configured to:
receive a first command to frontswap-store a huge page, which is stored in the normal memory area, in the compressed memory area, wherein a size of the huge page is larger than a regular page,
identify addresses of sub-pages of the huge page based on an address of the huge page,
compress the sub-pages using the addresses of the sub-pages to generate compressed sub-pages, and
store the compressed sub-pages in the compressed memory area.

2. The memory device of claim 1, wherein the near memory processing unit is configured to identify the addresses of the sub-pages based on whether the addresses of the sub-pages are consecutive.

3. The memory device of claim 1, wherein the near memory processing unit is configured to, when the sub-pages are stored in a consecutive address space, determine an address of a following sub-page of the sub-pages by adding a sub-page size to an address of a current sub-page of the sub-pages.

4. The memory device of claim 1, wherein the near memory processing unit is configured to:
when the sub-pages are stored in a non-consecutive address space, obtain a page frame number of a following sub-page of the sub-pages by performing a page table walk, and
determine an address of the following sub-page by adding a page offset of the following sub-page to the page frame number of the following sub-page.

5. The memory device of claim 1, wherein the near memory processing unit is configured to:
receive a second command to request a target sub-page of the huge page after the huge page is frontswap-stored in the compressed memory area,
determine a target frame number based on a difference between the address of the huge page and an address of the target sub-page,
determine an address of a compressed target sub-page in the compressed memory area based on the target frame number,
decompress the compressed target sub-page using the address of the compressed target sub-page to generate a decompressed target sub-page, and
store the decompressed target sub-page in the normal memory area.

6. The memory device of claim 5, wherein decompression of the compressed target sub-page is performed prior to decompression of remaining compressed sub-pages of the huge page.

7. The memory device of claim 1, wherein the memory comprises a first memory channel and a second memory channel.

8. The memory device of claim 7, wherein the sub-pages of the huge page are distributed across the first memory channel and the second memory channel, and
the near memory processing unit is configured to compress the sub-pages by parallel processing the sub-pages distributed across the first memory channel and the second memory channel.

9. The memory device of claim 7, wherein the near memory processing unit comprises a first processing unit disposed to communicate with the first memory channel and a second processing unit disposed to communicate with the second memory channel.

10. The memory device of claim 9, wherein, when a sub-page of the sub-pages is comprised in the first memory channel, the sub-page is compressed by the first processing unit, and when a sub-page of the sub-pages is comprised in the second memory channel, the sub-page is compressed by the second processing unit.

11. The memory device of claim 9, wherein the first processing unit is configured to compress a portion of the sub-pages stored in the first memory channel,
the second processing unit is configured to compress the other portion of the sub-pages stored in the second memory channel, and
a compression operation of the portion of the sub-pages by the first processing unit is performed in parallel with a compression operation of the other portion of the sub-pages by the second processing unit.

12. A memory device comprising:
a memory comprising a first memory channel comprising a first normal memory area and a first compressed memory area and a second memory channel comprising a second normal memory area and a second compressed memory area;
a first processing unit disposed to communicate with the first memory channel; and
a second processing unit disposed to communicate with the second memory channel,
wherein sub-pages of a huge page having a size larger than a regular page are distributed across the first normal memory area and the second normal memory area, and
in response to a first command to frontswap-store the huge page in the compressed memory area, the first processing unit and the second processing unit are configured to compress the sub-pages by parallel processing the sub-pages.

13. The memory device of claim 12, wherein, based on addresses of the sub-pages, when a sub-page of the sub-pages is comprised in the first memory channel, the sub-page is compressed by the first processing unit, and
when a sub-page of the sub-pages is comprised in the second memory channel, the sub-page is compressed by the second processing unit.

14. The memory device of claim 12, wherein the first processing unit is configured to compress a portion of the sub-pages stored in the first memory channel,
the second processing unit is configured to compress the other portion of the sub-pages stored in the second memory channel, and
a compression operation of the portion of the sub-pages by the first processing unit is performed in parallel with a compression operation of the other portion of the sub-pages by the second processing unit.

15. A memory management method of a memory device, the memory management method comprising:
receiving a first command to frontswap-store a huge page, which is stored in a normal memory area of a memory, in a compressed memory area of the memory, wherein a size of the huge page is larger than a regular page;
identifying addresses of sub-pages of the huge page based on an address of the huge page;
compressing the sub-pages using the addresses of the sub-pages to generate compressed sub-pages; and
storing the compressed sub-pages in the compressed memory area.

16. The memory management method of claim 15, wherein the identifying of the addresses of the sub-pages comprises, when the sub-pages are stored in a consecutive address space, determining an address of a following sub-page of the sub-pages by adding a sub-page size to an address of a current sub-page of the sub-pages.

17. The memory management method of claim 15, wherein the identifying of the addresses of the sub-pages comprises:
when the sub-pages are stored in a non-consecutive address space, obtaining a page frame number of a following sub-page of the sub-pages by performing a page table walk; and
determining an address of the following sub-page by adding a page offset of the following sub-page to the page frame number of the following sub-page.

18. The memory management method of claim 15, further comprising:
receiving a second command to request a target sub-page of the huge page after the huge page is frontswap-stored in the compressed memory area;
determining a target frame number based on a difference between the address of the huge page and an address of the target sub-page;
determining an address of a compressed target sub-page in the compressed memory area based on the target frame number;
decompressing the compressed target sub-page using the address of the compressed target sub-page to generate a decompressed target sub-page; and
storing the decompressed target sub-page in the normal memory area.

19. The memory management method of claim 15, wherein the memory comprises a first memory channel and a second memory channel,
the sub-pages of the huge page is distributed across the first memory channel and the second memory channel, and
the compressing of the sub-pages comprises compressing the sub-pages by parallel processing the sub-pages distributed across the first memory channel and the second memory channel.

20. The memory management method of claim 19, further comprising:
identifying memory channels comprising the sub-pages based on the addresses of the sub-pages;
when a sub-page of the sub-pages is comprised in the first memory channel, compressing the sub-page using a first processing unit disposed to communicate with the first memory channel; and
when the sub-page is comprised in the second memory channel, compressing the sub-page using a second processing unit disposed to communicate with the second memory channel.

* * * * *